(12) United States Patent
Pan et al.

(10) Patent No.: US 11,059,979 B2
(45) Date of Patent: Jul. 13, 2021

(54) NEAR INFRARED REFLECTIVE COATING COMPOSITION, COATING AND METHODS OF FORMING THE SAME

(71) Applicant: Agency for Science, Technology and Research, Singapore (SG)

(72) Inventors: Yongzheng Pan, Singapore (SG); Yew Wei Leong, Singapore (SG); Shengqin Wang, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 149 days.

(21) Appl. No.: 15/563,374

(22) PCT Filed: Mar. 30, 2016

(86) PCT No.: PCT/SG2016/050155
§ 371 (c)(1),
(2) Date: Sep. 29, 2017

(87) PCT Pub. No.: WO2016/159882
PCT Pub. Date: Oct. 6, 2016

(65) Prior Publication Data
US 2018/0086920 A1 Mar. 29, 2018

(30) Foreign Application Priority Data
Mar. 30, 2015 (SG) ............................ 10201502513U

(51) Int. Cl.
*B05D 3/00* (2006.01)
*C09D 5/33* (2006.01)
(Continued)

(52) U.S. Cl.
CPC ............. *C09D 5/004* (2013.01); *B05D 3/007* (2013.01); *C08G 59/50* (2013.01); *C09D 7/40* (2018.01); *C09D 7/61* (2018.01); *C09D 163/00* (2013.01)

(58) Field of Classification Search
CPC ....... B05D 3/007; C09D 5/004; C09D 163/00
See application file for complete search history.

(56) References Cited

U.S. PATENT DOCUMENTS 4,322,321 A * 3/1982 Dante .................... C08G 59/24
427/386
2010/0047620 A1* 2/2010 Decker .................... B05D 7/54
428/688
(Continued)

FOREIGN PATENT DOCUMENTS

CN 102399488 A 4/2012
CN 103881531 A 6/2014
(Continued)

OTHER PUBLICATIONS

International Preliminary Report on Patentability for International Application No. PCT/SG2016/050155 dated Jul. 12, 2017, pp. 1-46.
(Continued)

*Primary Examiner* — Elizabeth A Burkhart
(74) *Attorney, Agent, or Firm* — Winstead PC

(57) ABSTRACT

A near infrared reflective coating composition comprising a polymer resin, a polyamide resin and a suitable solvent. Preferred embodiments for the polymer resin include epoxy resins, acrylic resins, polyester resins or polyisocyanate resins. The composition further comprises additives such as a hardener, surfactant, fumed silica, metal oxide or mixed metal oxide pigments such as titanium oxide, chromium oxide, iron oxide or aluminium oxide. A method for forming the coating is also provided.

14 Claims, 10 Drawing Sheets

(51) Int. Cl.
*C09D 163/00* (2006.01)
*C08G 59/50* (2006.01)
*C09D 7/40* (2018.01)
*C09D 7/61* (2018.01)

(56) References Cited

U.S. PATENT DOCUMENTS

| | | | |
|---|---|---|---|
| 2011/0070376 A1* | 3/2011 | Wales | A01N 63/00 |
| | | | 427/414 |
| 2013/0036944 A1* | 2/2013 | Nuccetelli | C09C 1/24 |
| | | | 106/453 |
| 2014/0233092 A1* | 8/2014 | Nojima | B32B 7/02 |
| | | | 359/359 |

FOREIGN PATENT DOCUMENTS

| | | |
|---|---|---|
| CN | 103992725 A | 8/2014 |
| CN | 104004436 A | 8/2014 |
| IL | 56485 A | 1/1979 |
| IL | 107878 A | 4/1999 |

OTHER PUBLICATIONS

Written Opinion for International Application No. PCT/SG2016/050155 dated Apr. 28, 2017, pp. 1-4.

* cited by examiner

FIG. 2

200 providing a polymer resin — 202 adding a polyamide resin to the polymer resin for curing the polymer resin — 204 adding a suitable solvent for dissolving the polymer resin and the polyamide resin — 206

FIG. 3

300 providing a substrate — 302 apply the coating composition onto the substrate — 304 allowing the coating composition to cure and/dry to form the coating — 306

FIG. 4

| Ingredient | Percents by weight (%) | | | | | |
|---|---|---|---|---|---|---|
| | Sample 1 | Sample 2 | Sample 3 | Sample 4 | Sample 5 | Sample 6 |
| Epoxy Resin (Araldite LY1564) | 20-30 | 20-30 | 20-30 | 20-30 | 20-30 | 30-45 |
| Hardener (Aradur 3487) | 6-9 | 6-9 | 6-9 | 6-9 | 6-9 | 9-15 |
| Polyamide resin (polyamide 650) | 10-20 | 10-20 | 10-20 | 10-20 | 10-20 | - |
| 1-methoxy-2-propanol | 40-60 | 40-60 | 40-60 | 40-60 | 40-60 | 40-60 |
| Isopropanol | 3-4 | 3-4 | 3-4 | 3-4 | 3-4 | 3-4 |
| Surfactant (DisperBYK-2151) | 0.1-1.0 | 0.1-1.0 | 0.1-1.0 | 0.1-1.0 | 0.1-1.0 | 0.1-1.0 |
| Fumed silica | 0.1-1.0 | 0.1-1.0 | 0.1-1.0 | 0.1-1.0 | 0.1-1.0 | 0.1-1.0 |
| Pigment 1 | 2-3 | - | - | - | - | - |
| Pigment 2 | - | 2-3 | - | - | - | - |
| Pigment 3 | - | - | 2-3 | - | - | - |
| Pigment 4 | - | - | - | 2-3 | - | 2-3 |
| $Fe_3O_4$ | - | - | - | - | 2-3 | - |

| Sample No. | Solar Reflectance | | | | Color | Adhesion strength (MPa) |
|---|---|---|---|---|---|---|
| | Total | UV | Visible | Near Infrared | | |
| 1 | 0.19 | 0.06 | 0.12 | 0.19 | Dark Green | 3.12 |
| 2 | 0.13 | 0.05 | 0.05 | 0.13 | Black | 3.33 |
| 3 | 0.15 | 0.05 | 0.06 | 0.15 | Black | 3.85 |
| 4 | 0.25 | 0.06 | 0.11 | 0.26 | Dark Brown | 3.28 |
| 5 | 0.05 | 0.05 | 0.05 | 0.05 | Black | 3.43 |
| 6 | 0.15 | 0.05 | 0.06 | 0.15 | Black | 0.96 | ns
NEAR INFRARED REFLECTIVE COATING COMPOSITION, COATING AND METHODS OF FORMING THE SAME

CROSS-REFERENCE TO RELATED APPLICATION

This application claims the benefit of priority of Singapore application No. 10201502513U filed Mar. 30, 2015, the contents of it being hereby incorporated by reference in its entirety for all purposes.

TECHNICAL FIELD

Various aspects of this disclosure relate to coating compositions, coatings, and methods of forming the same.

BACKGROUND

It is known that about 5% of solar energy reaches Earth in the form of ultraviolet rays (200-400 nm), about 43% in the form of visible light (400-700 nm) and about 52% in the form of near infrared radiation (700-2500 nm).

Absorption of solar radiation by objects in the visible range of wavelength gives the objects the visual appearance of color depending on the wavelength they absorb or reflect. Solar heating is contributed primarily by infrared radiation.

Control of the spread of thermal energy in domestic buildings through passive techniques helps reduce energy consumption by reducing reliance of artificial heating in temperate environments as well as artificial cooling/air-conditioning in tropical environments.

For example, the aluminum surfaces of window frames in glazed buildings are exposed to sunshine. Due to the high thermal conductivity of aluminum, the heat absorbed by the aluminum surface may be easily transmitted through the frame to interior room, thus increasing overall heat gain and interior temperature. In order to reduce chlorofluorocarbon emission and to improve energy efficiency, there is a need for new technologies to reduce the solar heat loads and to allow reduce the vast amounts of energy spent on artificial cooling/air-conditioning.

Traditional coatings absorb strongly in the visible as well as in the near infrared region of solar spectrum. The objects painted or coated by these coatings tend to heat up easily because of extra heat gain due to absorption in the near infrared region. Near infrared reflective coatings may help reflect solar rays, especially near infrared rays, back into the atmosphere. The result is lower exterior surface temperatures, less heat gain, reduced building energy consumption and cooler interior temperatures.

Currently, plenty of effort has been made to develop near infrared reflective coatings for different substrates, including glass, concrete, cement, brick and stucco, that can be used in buildings. However, there are limited choices in near infrared reflective coatings for metal substrates and components, which are commonly used in buildings, automotives, marine and offshore tanks.

SUMMARY

Various aspects of this disclosure provide a coating composition including a polymer resin. The coating composition may further include a polyamide resin for curing the polymer resin. Additionally, the coating composition may include a suitable solvent for dissolving the polymer resin and the polyamide resin.

Various aspects of this disclosure provide a method of forming a coating composition. The method may include providing a polymer resin. The method may further include adding a polyamide resin to the polymer resin for curing the polymer resin. The method may also include adding a suitable solvent for dissolving the polymer resin and the polyamide resin.

Various aspects of this disclosure may provide a method of forming a coating. The method may include providing a substrate. The method may further include applying a coating composition as described herein onto the substrate. The method may also include allowing the coating composition to cure to form the coating.

BRIEF DESCRIPTION OF THE DRAWINGS

The invention will be better understood with reference to the detailed description when considered in conjunction with the non-limiting examples and the accompanying drawings, in which:

FIG. 2 is a schematic showing the method of forming a coating composition according to various embodiments.

FIG. 3 is a schematic showing the method of forming a coating according to various embodiments.

FIG. 4 is a table showing the composition of various coating compositions according to various embodiments as well as a control (Sample 6).

FIG. 7 is a table indicating measured total reflectance, and reflectance in ultraviolet (UV), Visible and near infrared (NIR) ranges (in arbitrary units or a.u.) as well as adhesion strength (in mega-pascals or MPa) and colour of Samples 1 to 6.

FIG. 8C is a photo showing some of the applications in which the coating composition according to various embodiments may be applied to.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

Figure 1:
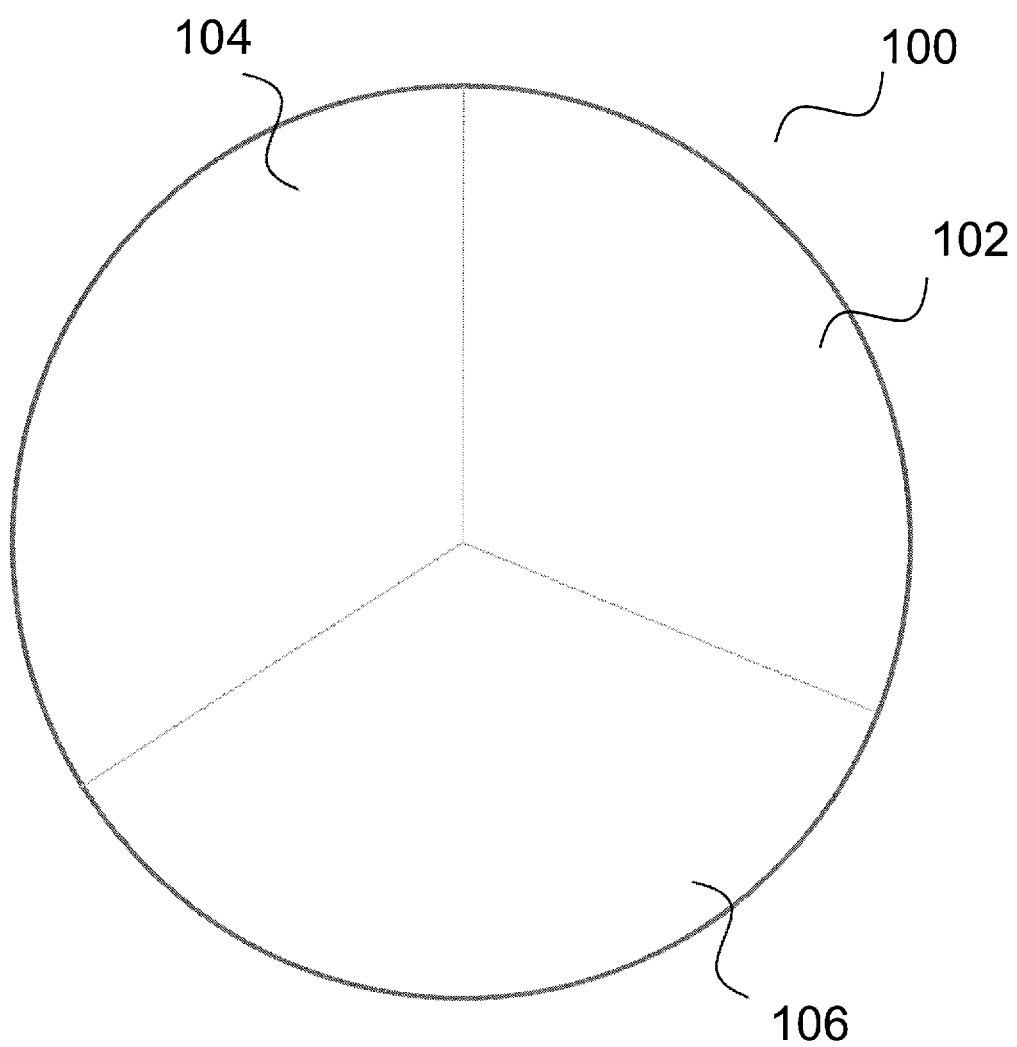
FIG. 1 is a schematic illustrating a coating composition according to various embodiments.

In various embodiments, a coating composition may be provided. FIG. 1 is a schematic illustrating a coating composition 100 according to various embodiments. The coating composition 100 may include a polymer resin 102. The coating composition 100 may further include a polyamide resin 104 for curing the polymer resin 102. Additionally, the coating composition 100 may include a suitable solvent 106 for dissolving the polymer resin 102 and the polyamide resin 104.

In other words, the coating composition may include a polymer resin 102, a polyamide resin 104 and a suitable solvent 106.

FIG. 1 does not imply that the coating composition 100 includes the polymer resin 102, the polyamide resin 104, and the suitable solvent 106 in equal proportions or is limited to any fixed proportion. Various embodiments may include the polymer resin 102, the polyamide resin 104 and the suitable solvent 106 in any proportions.

However, in various other embodiments, the polymer resin 102, the polyamide resin 104 and/or the suitable solvent 106 may be limited to a certain concentration/weight loading/proportion as described herein. Further, the coating composition may not be limited to the polymer resin 102, the polyamide resin 104 and the suitable solvent 106. In various embodiments, the coating composition 100 may also include other solvents, epoxy curing agents, pigments, surfactants, and/or other needed additives.

The polyamide resin 104 may act as an adhesion promoter. The coating composition 100 including the polyamide resin 104 may help improve adhesion of the coating composition 100 to a metal surface, a metal substrate or a metal component It is found that the presence of polyamide resin 104 in the coating composition may surprisingly improve adhesion of the coating formed to a substrate. Various embodiments may improve the curing efficiency and/or the toughness of the coating.

Various embodiments may help address the lack of coatings for coating onto metal surfaces. Further, the polyamide resin 104 may act as an epoxy curing agent. The coating composition 100 may be a near infrared reflective coating. For instance, the coating composition 100 may further include a further solvent such as isopropanol. The further solvent may be able to dissolve certain constituents such as polyamide resin 104 better than the solvent 106. Other suitable solvents or further solvents may include water, and/or various organic solvents as the diluent, including aliphatics, aromatics, alcohols, ketones and white spirit, and/or combinations thereof In various embodiments, the suitable solvent 106 may include or may be a glycol ether such as 1-methoxy-2-propanol or 2-butoxyethanol. The solvent 106 may make up more than 30 weight percent (wt %) of the coating composition. The solvent 106 may have a concentration or weight loading be any value selected from a range of about 40 to about 90 weight percent (wt %), e.g. about 40 to about 60 weight percent (wt %). The further solvent may have a concentration or weight loading be any value selected from a range of about 1 to about 40 weight percent (wt %), e.g. about 3 to about 4 weight percent (wt %).

For avoidance of doubt, any concentration or weight loading of any constituent is made with reference to the coating composition, unless otherwise stated. As such, a weight loading or concentration of 6 weight percent for a constituent means that the constituent is 6% of the total weight of the entire coating composition. A concentration described herein may refer to a percentage weight concentration.

In various embodiments, the polymer resin 102 may be any selected from a group consisting of an epoxy resin, an acrylic resin, a polyester resin and a polyisocyanate. The polymer resin 102 may be configured to be cured by the polyamide resin 104 or/and chemically react with the polyamide resin 104. The polymer resin 102 may also be referred to as a coating binder.

In various embodiments, the polymer resin 102 may be an epoxy resin, such as a bisphenol-A epoxy, a bisphenol-F epoxy, or a cycloaliphatic epoxy resin. The epoxy resin may be Araldite LY1564. The epoxy resin may be a room temperature cured epoxy resin.

In various embodiments, the polymer resin 102 may be a room temperature cured epoxy resin, which can be dissolved and processed in organic solvents.

In various embodiments, the coating composition 100 may further include a hardener for curing the polymer resin 102. In other words, the polymer resin 102 may be cured by both the polyamide resin 104 and the suitable hardener. Curing the polymer resin 102 may refer to turning the coating composition from the liquid state to a solid state via a cross-linking chemical reaction. The polyamide resin 104 and/or the suitable hardener may form one or more chemical bonds with the polymer resin 102. During curing, the polymer resin 102 chains/molecules may cross-link with the one another and/or with polyamide resin 104 chains/molecules and/or the suitable hardener chains/molecules.

The hardener may include a polyamine based hardener, an aromatic amine based hardener, a phenalkamine based hardener, a polyamine based hardener, or a polyamidoamine based hardener. The hardener may be Aradur 3487. A concentration or weight loading of the hardener may be any value selected from a range of about 5 to about 20 weight percent (wt %), e.g. about 6 to about 9 weight percent (wt %).

A coating composition as described herein may refer to a composition including or made up primarily of liquids while a coating as described herein may refer to a cured or dried substance. The coating may refer to a film wherein the solvent and/or further solvent has substantially evaporated.

In various embodiments, a weight loading or concentration of the polymer resin 102 may be any value selected from a range of about 15 to about 40 weight percent (wt %), e.g. about 20 to about 30 weight percent (wt %).

In various embodiments, a weight loading or a concentration of the polyamide resin 104 is any value selected from a range of about 5 to 30 weight percent (wt %), e.g. about 10 to about 20 weight percent (wt %). A polyamide is a macromolecule with repeating units linked by amide bonds. The polyamide resin 104 may be an aliphatic polyamide (such as nylon), a polyphthalamide or an aramide. The polyamide resin may be polyamide 200 or polyamide 650.

The coating composition 100 may further include a suitable pigment. The suitable pigment may include one or more metal oxides. The suitable pigment may include one or more metal oxides selected from a group consisting of chromium oxide, iron oxide, aluminum oxide and titanium oxide. In various embodiments, the suitable pigment comprises mixed metal oxides consisting of chromium oxide, iron oxide, aluminum oxide and titanium oxide. In various embodiments, the coating composition 100 may contain a weight ratio of chromium oxide: iron oxide: aluminum oxide: titanium oxide within a range of 4-6:4-6:0.1-0.5:0.1-0.5. For instance, the coating composition 100 may contain a weight ratio of chromium oxide: iron oxide: aluminum oxide: titanium oxide of 4:4:0.1:0.1 or a weight ratio of chromium oxide: iron oxide: aluminum oxide: titanium oxide of 6:6:0.5:0.5. In various embodiments, the coating composition 100 may have a ratio by weight of chromium oxide: iron oxide: aluminum oxide: titanium oxide to be 5.07:5.33:0.34:0.27.

Other suitable pigments may include natural pigments such as various clays, calcium carbonate, mica, silicas, talcs, or the like, and synthetic pigments such as engineered molecules, calcined clays, blanc fixe, precipitated calcium carbonate, synthetic pyrogenic silicas, or the like.

The suitable pigment may affect the solar reflectance of the coating composition 100. The suitable pigment may affect the solar reflectance of the coating composition 100 by varying the reflectance of ultraviolet radiation, the reflectance of visible light and/or the reflectance of near infrared radiation. The suitable pigment may impart the coating composition 100 or the coating formed from the coating composition 100 a particular colour dependent on the absorbance/reflectance of different wavelengths of visible light.

In various embodiments, the concentration or weight loading of the suitable pigment may be any value selected from a range of about 1 to about 5 weight percent (wt %), e.g. about 2 to about 3 weight percent (wt %). In various embodiments, the coating composition 100 may include more than one pigment.

In various embodiments, the coating composition 100 may include a suitable surfactant for dispersing the suitable pigment in the solvent and/or further solvent. The surfactant may be a block copolymer with pigment affinic group(s), such as DisperBYK-2151. The surfactant may be an ethoxylate, an alkoxylate, a sulfosuccinate, a sulfate or a sulfonate The surfactant may lower the interfacial tension between the solvent and the pigment compounds/molecules.

In various embodiments, the concentration or weight loading of the suitable surfactant may be any value selected from a range of about 0.001 to about 5 weight percent (wt %), e.g. about 0.1 to about 1.0 weight percent (wt %).

In various embodiments, the coating composition 100 may include a thickener such as fumed silica for increasing a viscosity of said coating composition 100. Microscopic droplets of amorphous silica are fused into branched, chain-like, three-dimensional secondary particles which then agglomerate into tertiary particles to form fumed silica. The three-dimensional, low bulk density and high surface area may give rise to viscosity increasing behavior. In various embodiments, the concentration or weight loading of the suitable thickener may be any value selected from a range of about 0.001 to about 3 weight percent (wt %), e.g. about 0.1 to about 1.0 weight percent (wt %).

Various embodiments allow a coating of high adhesion strength to be formed. The coating formed by a coating composition 100 according to various embodiments may exhibit an adhesion strength of above 1 MPa, or above 1.5 MPa, or above 2 MPa, or above 3 MPa.

Various embodiments allow a coating of high solar reflectance to be formed. The coating or coating composition may be of a lighter color such as green or brown. In various embodiments, the coating may exhibit a solar reflectance of above 0.18 arbitrary units (a.u.) or above 0.2 a.u. or above 0.25 a.u. In various embodiments, the coating may exhibit a visible light reflectance of above 0.10 arbitrary units (a.u.) or above 0.11 a.u. In various embodiments, the coating may exhibit a near infra red light reflectance of above 0.18 arbitrary units (a.u.) or above 0.25 a.u.

In various embodiments, a method of forming a coating composition may be provided. FIG. 2 is a schematic 200 showing the method of forming a coating composition according to various embodiments. The method may include, in 202, providing a polymer resin. The method may further include, in 204, adding a polyamide resin to the polymer resin for curing the polymer resin. The method may also include, in 206, adding a suitable solvent for dissolving the polymer resin and the polyamide resin.

In other words, forming a coating composition may include mixing a polyamide resin, a polymer resin, and the solvent.

FIG. 2 does not imply that the constituents are added in any particular order. For instance, the polymer resin may be added to the solvent first before adding the polymer resin. Nevertheless, in some embodiments, certain steps may be performed before, after, or concurrently with other steps as described herein.

The suitable solvent may include a glycol ether such as 1-methoxy-2-propanol. The polymer resin may be any selected from a group consisting of an epoxy resin, an acrylic resin, a polyester resin and a polyisocyanate.

In various embodiments, the method may include dispersing or adding a suitable pigment.

In various embodiments, the method may include dispersing or adding a suitable pigment in the suitable solvent to form a dispersion before adding the polymer resin to form a mixture. The method may further include adding a suitable surfactant to form the dispersion before adding the polymer resin. The suitable surfactant may help in dispersing the pigment in the suitable solvent. The mixture may then be mixed, e.g. using ball milling, for a suitable period of time, e.g. about 10-14 hours, e.g. about 12 hours.

In various embodiments, the method may include mixing a plurality of metal oxides. In other words, different types of metal oxides may be mixed together, e.g. using ball milling. The method may also include heating or calcining the plurality of metal oxides to form the suitable pigment. The heating or calcination may be carried out at a temperature selected from a range of about 800° C. to about 1500° C., e.g. about 900° C. to about 1200° C., e.g. about 930° C. The heating or calcination may be carried out for a suitable period of about 3 hours to about 5 hours, e.g. about 4 hours. The method may further involve grinding the plurality of metal oxides before heating the plurality of metal oxides.

In various embodiments, the method may include adding a suitable hardener. In various embodiments, the method may include dissolving the polyamide resin and a suitable hardener in a further suitable solvent, such as isopropanol, to form a further mixture before mixing the mixture with the further mixture.

The method may further include adding a thickener such as fumed silica.

Various embodiments may include a coating composition formed by a method described herein.

In various embodiments, a method of forming a coating may be provided. FIG. 3 is a schematic 300 showing the method of forming a coating according to various embodiments. The method may include, in 302, providing a substrate. The method may include, in 304, applying a coating composition as described herein onto the substrate. The method may include in, 306, allowing or awaiting for the coating composition to cure and/or dry to form the coating.

The substrate may be a metal substrate, a metal component, or a metal surface. Various embodiments may provide a coating composition which may be applied onto a metal substrate, a metal component, or a metal surface. The metal may be aluminum.

The curing and/or drying may be carried out at a suitable temperature such as between 10° C. to about 50° C., e.g. about 15° C. to about 35° C. The curing and/or drying may be carried out at room temperature, i.e. about 25° C. Various embodiments may provide a coating composition which is able to form a coating at room temperature. Various embodiments may provide a coating composition which allows an easy and convenient method to form the coating, and/or which does not require additional equipment for curing/drying the coating composition.

The curing/drying may be carried out over a suitable period of time, e.g. from 12 hours to 48 hours, e.g. about 24 hours.

Various embodiments may relate to a coating formed by a method described herein. Various embodiments may relate to a coated substrate including a substrate and a coating as described herein on the substrate.

Experimental Section

To explain the properties and performance of the coatings, 6 samples were prepared. The components and preparing method of these samples are listed as following. The ingredient of various coating samples are shown in FIG. 4.

FIG. 4 is a table 400 showing the composition of various coating compositions according to various embodiments as well as a control (Sample 6).

Besides epoxy resin, the ingredient includes solvents, epoxy curing agent, pigments, surfactants, and other needed additives. The epoxy resin (Araldite LY1564) act as a coating binder and hardener (Aradur 3487) is used to cure the epoxy resin. The concentration of epoxy resin is preferably 20-30 weight percentage (wt %) and that of hardener is 6-9 wt %. The incorporation of polyamide resin (polyamide 650) is very important to impart strong adhesion with aluminum substrate, which renders this coating to be administered even without any pretreatment on the substrate. The concentration is 10-20 wt %. 1-methoxy-2-propanol is the main solvent of the coating, which is used to dissolve resin and disperse various pigments and additives. The concentration of 1-methoxy-2-propanol is 40-60 wt %. Isopropanol acts as an assistive solvent to control the evaporating rate and its concentration is 3-4 wt %. Surfactant (DisperBYK-2151) is used to assist the uniform dispersion stability of pigments in the coating and its concentration is 0.1-1.0 wt %. Fumed silica is added to adjust the coating viscosity and its concentration is 0.1-1.0 wt %. The near infrared pigments were synthesized from several different metal oxides with specific ratios at high temperature. Four kinds of dark-colored and infrared reflective pigments (Pigment 1, 2, 3 and 4) were synthesized and applied in coatings in this invention. The concentration of the pigment is 2-3 wt %. $Fe_3O_4$ is a conventional black-colored pigment without infrared reflectivity. It is used to prepare a sample as reference (Sample 5).

Preparation

Sample 1:

9.65 g chrome oxide, 0.9 g iron oxide, 0.26 g titanium oxide were thoroughly mixed in a ball miller for 24 h and calcined at 1150° C. for three hours. The calcined mixed metal oxide was grinded thoroughly in a mortar and the obtained substance is named Pigment 1. Pigment 1 and surfactant (DisperBYK-2151) were dispersed in a certain amount of 1-methoxy-2-propanol and ball milled for 12 hours. The milled mixture was mixed with Epoxy Resin (Araldite LY1564) and formed mixture A. Polyamide resin (polyamide 650) and hardener (Aradur 3487) were dissolved in a certain amount of isopropanol (IPA), and formed mixture B. A and B were mixed thoroughly and coating on a bare aluminum plate. The coating was placed in a fume hood at room temperature for 24 hours for drying and curing. The aluminum plate was cleaned by acetone before use.

Sample 2:

2.3 g chrome oxide, 7.6 g iron oxide, 0.5 g aluminum oxide from aluminum hydrate and 0.5 g titanium oxide were thoroughly mixed in a ball miller for 24 h and calcined at 1150° C. for three hours. The calcined mixed metal oxide was grinded thoroughly in a mortar and the obtained substance is named Pigment 2. Pigment 2 and surfactant (DisperBYK-2151) were dispersed in a certain amount of 1-methoxy-2-propanol and ball milled for 12 hours. The rest steps were same as those in Sample 1.

Sample 3:

4.8 g chrome oxide, 4.8 g iron oxide, 0.2 g aluminum oxide from aluminum hydrate and 0.2 g titanium oxide were thoroughly mixed in a ball miller for 24 h and calcined at 1150° C. for three hours. The calcined mixed metal oxide was grinded thoroughly in a mortar and the obtained substance is named Pigment 3. Pigment 3 and surfactant (DisperBYK-2151) were dispersed in a certain amount of 1-methoxy-2-propanol and ball milled for 12 hours. The rest steps were same as those in Sample 1.

Sample 4:

5.07 g chrome oxide, 5.33 g iron oxide, 0.34 g aluminum oxide from aluminum hydrate and 0.27 g titanium oxide were thoroughly mixed in a ball miller for 24 h and calcined at 930° C. for four hours. The calcined mixed metal oxide was grinded thoroughly in a mortar and the obtained substance is named Pigment 4. Pigment 4 and surfactant (DisperBYK-2151) were dispersed in a certain amount of 1-methoxy-2-propanol and ball milled for 12 hours. The rest steps were same as those in Sample 1.

Sample 5:

$Fe_3O_4$ and surfactant (DisperBYK-2151) were dispersed in a certain amount of 1-methoxy-2-propanol and ball milled for 12 hours. The milled mixture was mixed with Epoxy Resin (Araldite LY1564) and formed mixture A. Polyamide resin (polyamide 650) and hardener (Aradur 3487) were dissolved in a certain amount of isopropanol (IPA), and formed mixture B. A and B were mixed thoroughly and coating on a bare aluminum plate. The rest steps were same as those in Sample 1.

Sample 6:

4.8 g chrome oxide, 4.8 g iron oxide, 0.2 g aluminum oxide from aluminum hydrate and 0.2 g titanium oxide were thoroughly mixed in a ball miller for 24 h and calcined at 1150° C. for three hours. The calcined mixed metal oxide was grinded thoroughly in a mortar and the obtained substance is named Pigment 3. Pigment 3 and surfactant (DisperBYK-2151) were dispersed in a certain amount of 1-methoxy-2-propanol and ball milled for 12 hours. The milled mixture was mixed with Epoxy Resin (Araldite LY1564) and formed mixture A. Hardener (Aradur 3487) were dissolved in a certain amount of isopropanol (IPA), and formed mixture B. A and B were mixed thoroughly and coating on a bare aluminum plate. The coating was placed in a fume hood at room temperature for 24 hours for drying and curing. The aluminum plate was cleaned by acetone before use.

Testing

The diffuse spectral reflectance in the spectral range of 0.3 to 2.5 µm was determined using a double-beam ultraviolet/visible/near infrared (UV/Vis/NIR) spectrophotometer fitted with a reflectance spectroscopy accessory. Both diffuse and specular reflected radiation was collected by the integrated sphere.

Spectral reflectance was converted to overall solar reflectance by weighted averaging, using a standard solar spectrum as the weighting function. The spectrum used was that suggested by ASTM (E903 and E892), and represented both direct and diffuse solar radiation with the sun high in the sky. For opaque materials, the reflectance is equal to (1-α), where α is the solar absorbance.

Figure 5:
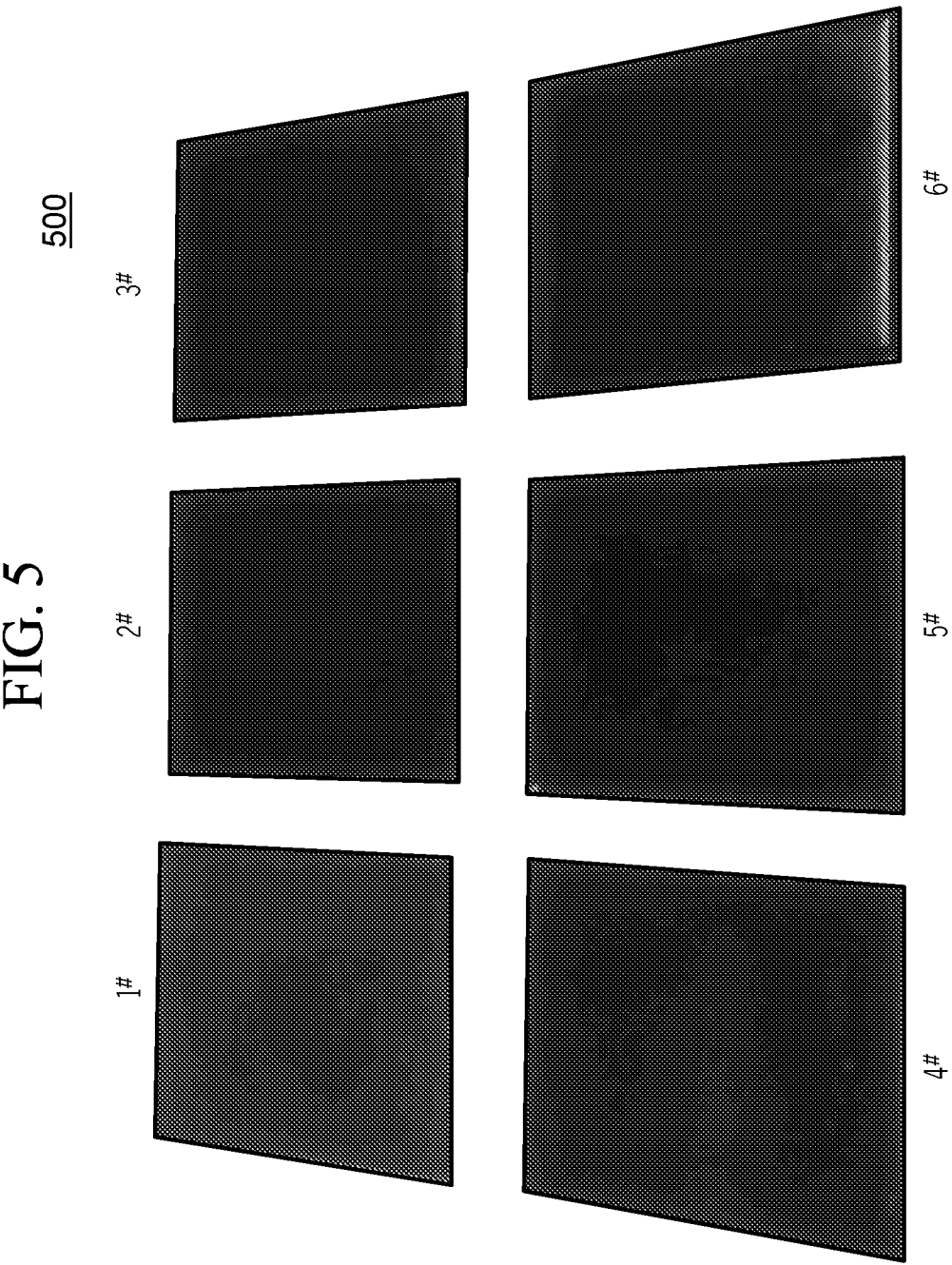
FIG. 5 is an image showing Samples 1 to 6.

FIG. 5 is an image 500 showing Samples 1 to 6. Sample 1 is dark green; Sample 2, 3, 5 and 6 are black; and Sample 4 is dark brown.

Figure 6:
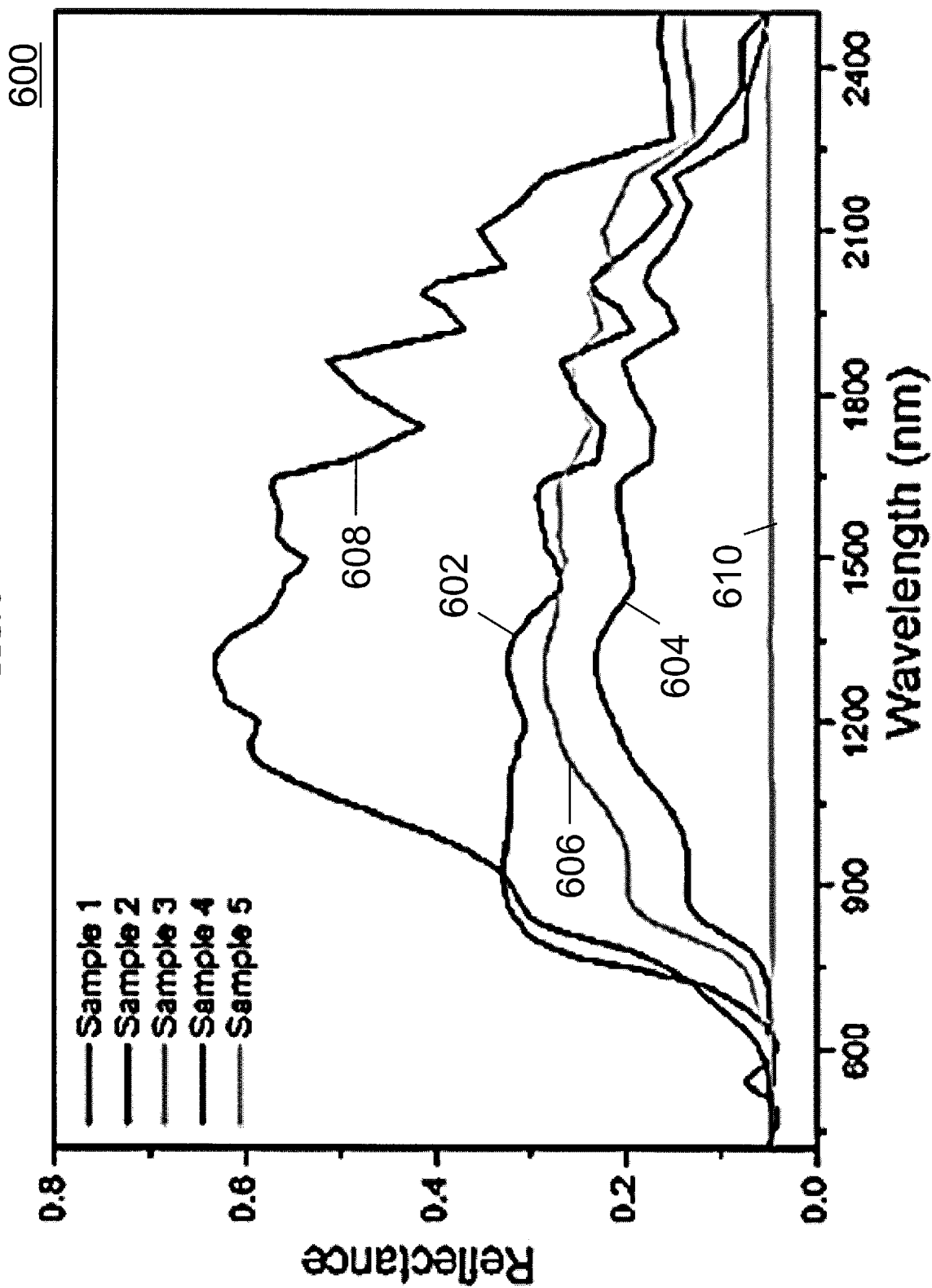
FIG. 6 is a plot of reflectance (arbitrary units or a.u.) against wavelengths (nanometers or nm) showing the solar reflectance of Samples 1 to 5.

The solar reflectance curves of Samples 1 to 5 are shown in FIG. 6 and the reflectance values of Samples 1 to 6 are listed in FIG. 7, including the total reflectance, and reflectance in ultraviolet (UV), Visible and near infrared (NIR) ranges, respectively.

FIG. 6 is a plot 600 of reflectance (arbitrary units or a.u.) against wavelengths (nanometers or nm) showing the solar reflectance of Samples 1 to 5. 602 shows the solar reflectance values for Sample 1; 604 shows the solar reflectance values for Sample 2; 606 shows the solar reflectance values for Sample 3; 608 shows the solar reflectance values for Sample 4; and 610 shows the solar reflectance values for Sample 5.

FIG. 7 is a table 700 indicating measured total reflectance, and reflectance in ultraviolet (UV), Visible and near infrared (NIR) ranges (in arbitrary units or a.u.) as well as adhesion strength (in mega-pascals or MPa) and colour of Samples 1 to 6.

Sample 4 is a black-colored coating containing ordinary black pigment, $Fe_3O_4$, and its solar reflectance is only 0.25. The reflectance in visible light range of Sample 2 and 3 are The same as that of Sample 5, therefore they look black by naked eye. However, their solar reflectances are 0.13 and 0.15, respectively, almost 3 times higher than that of Sample 5.

Sample 1 shows dark green. It has a reflectance of 0.06 in visible range and 0.19 in near infrared range. Among 5 samples, Sample 4 shows the highest solar reflectance, 0.25. It shows dark brown and its reflectance in near infrared range is 0.26. Sample 6 shows the same reflectance with Sample 3, so its curve is not shown in FIG. 6.

The pull-off adhesion strength of the coatings to aluminum substrate was measured by a PosiTest pull-off adhesion test according to ASTM D4541.

Polyamide resin (polyamide 650) was added to Samples 1 to 5 as both an epoxy curing agent and an adhesion promoter. In contrast, only hardener (Aradur 3487) was used as the epoxy curing agent in Sample 6. All the adhesion test results are listed in FIG. 7. Apparently, all the coatings containing polyamide resin (Sample 1 to 5) show adhesion strength higher than 3 MPa, which are much higher than that of Sample 6 (0.96 MPa). The addition of polyamide resin (polyamide 650) is the key factor to provide the coatings with a strong adhesion to aluminum substrate.

Figure 8A:
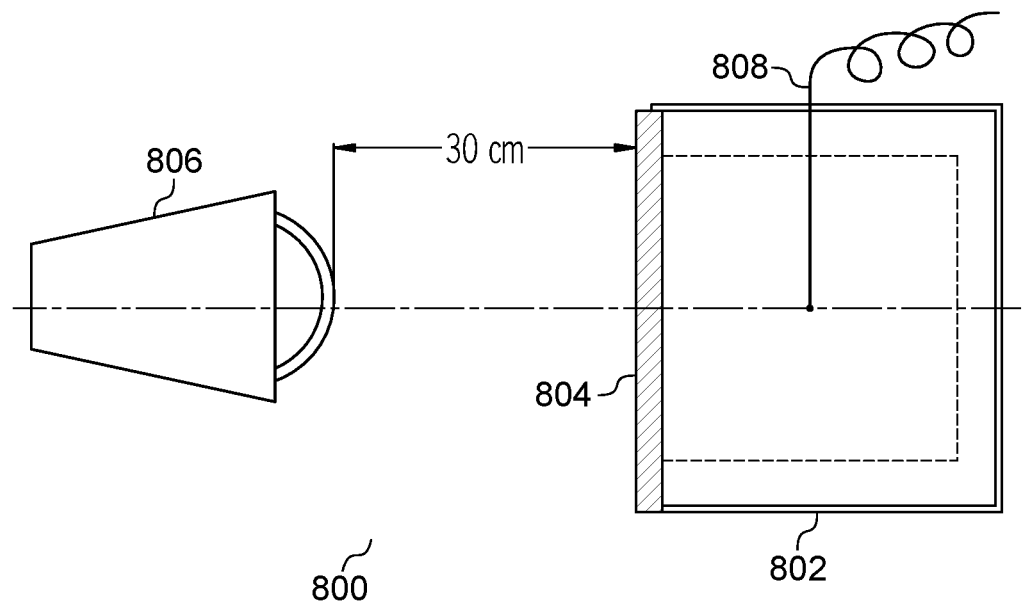
FIG. 8A is a schematic of a setup for in evaluating the effectiveness of various coatings according to various embodiments in reflecting near infrared radiation.
Figure 8B:
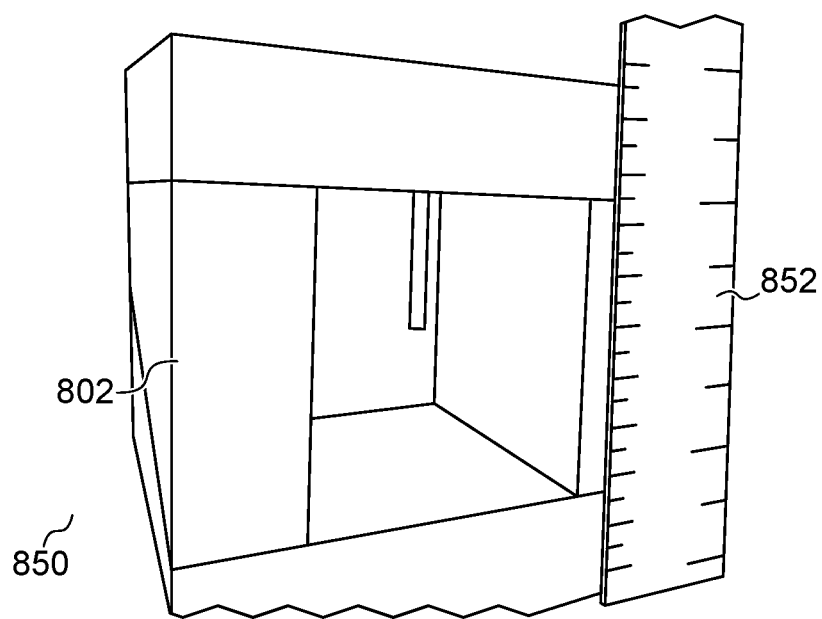
FIG. 8B is a photo of the insulation box 802.
Figure 8C:
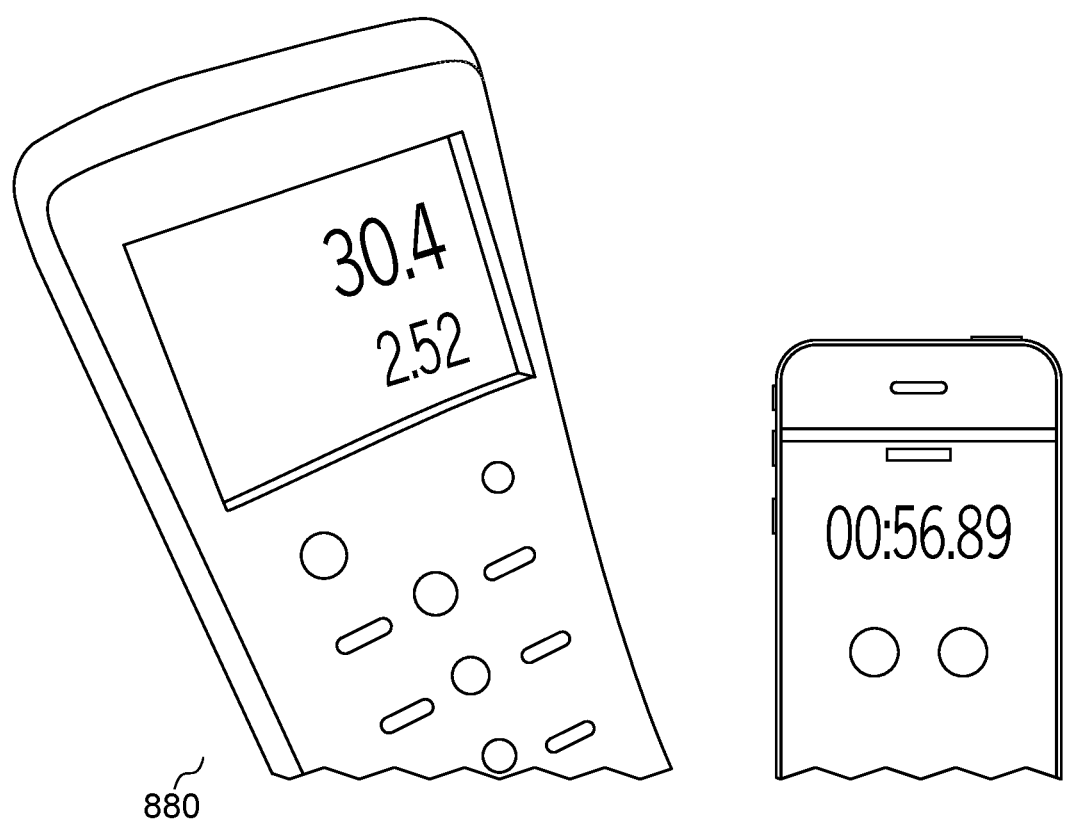
Figure 9:
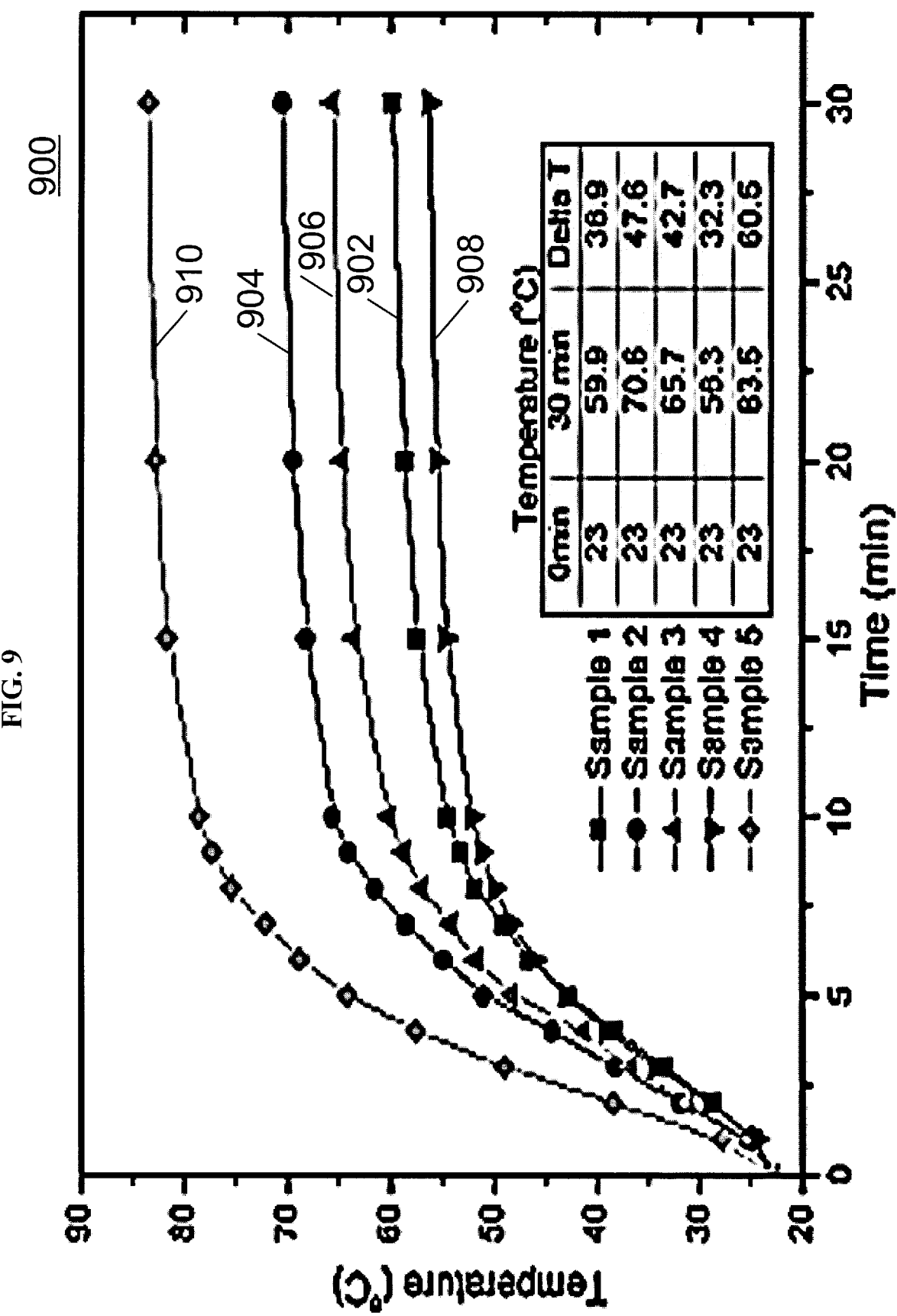
FIG. 9 is a plot of temperature (degrees Celsius or ° C.) against time (minutes or min) showing the increase in temperature inside the box 802 over time when different samples 804 are placed.

An insulation box was built to evaluate the effect of near infrared reflective coatings on inside temperature of buildings or vehicles. The schematic and photo of the insulation box is shown in FIG. 8A and FIG. 9. FIG. 8A is a schematic of a setup 800 for in evaluating the effectiveness of various coatings according to various embodiments in reflecting near infrared radiation. FIG. 8B is a photo 850 of the insulation box 802. A ruler 852 was placed to indicate the dimensions of the box 802. FIG. 8C is a photo 880 showing some of the applications in which the coating composition according to various embodiments may be applied to.

The dimension of the insulation box 802 is 10 cm*10 cm*10 cm and it is made of thermal insulating polystyrene foam with a thickness of 2 mm. One face of this box 802 is open or empty and a coated aluminum plate 804 (10 cm*10 cm) would be stuck on box 802 upon testing. A 150 W infrared (IR) lamp 806 is placed 30 cm away to the coated plate 804 and insulation box 802. The temperature inside the box 802 was recorded by an inserted thermal couple 808. Sample 5 with a solar reflectance of 0.05 was set as the reference.

The temperature changes of the insulation box with different coatings are drawn in FIG. 9. FIG. 9 is a plot 900 of temperature (degrees Celsius or ° C.) against time (minutes or min) showing the increase in temperature inside the box 802 over time when different samples 804 are placed. 902 shows the temperature variation for Sample 1; 904 shows the temperature variation for Sample 2; 906 shows the temperature variation for Sample 3; 908 shows the temperature variation for Sample 4; and 910 shows the temperature variation for Sample 5. The inset of FIG. 9 shows the initial temperature at the start (at 0 min) and the temperature after 30 min, as well as the difference between the initial temperature and the temperature after 30 min (under delta T).

For all the samples, the temperatures increased fast in the beginning 10 min. After 15 min, the temperatures gradually become constant. It is concluded that samples with higher reflectance shows lower temperature increase because near infrared light is reflected and heat energy cannot be transferred and conducted into the box. Sample 5 shows a temperature increase of 60.5° C., while that of dark-colored Sample 3 is only 42.7° C. Therefore, it can be concluded that the dark-colored near infrared coatings are able to effectively reduce the inside temperature and heat build-up of buildings or vehicles when are exposed to a solar or infrared radiation source.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A coating composition comprising:
   a polymer resin;
   a polyamide resin for curing the polymer resin;
   a suitable pigment consisting of chromium oxide, iron oxide, aluminium oxide and titanium oxide in a weight ratio of chromium oxide: iron oxide: aluminium oxide: titanium oxide within a range of 5-5.1:5.3-5.4:0.3-0.4: 0.2-0.3;
   a suitable solvent for dissolving the polymer resin and the polyamide resin; and
   a surfactant configured to lower interfacial tension between the solvent and the pigment consisting of chromium oxide, iron oxide, aluminium oxide and titanium oxide, the surfactant being a block copolymer with one or more pigment affinic groups;
   wherein the coating composition is configured to form a coating having a near infrared light reflectance of above 0.25.

2. The coating composition according to claim 1, wherein the polymer resin may be any selected from a group consisting of an epoxy resin, an acrylic resin, a polyester resin and a polyisocyanate.

3. The coating composition according to claim 1, further comprising:
   a hardener for curing the polymer resin.

4. The coating composition according to claim 3, wherein a weight loading of the hardener is any value selected from a range of about 6 to about 9 weight percent of the coating composition.

5. The coating composition according to claim 1, wherein a weight loading of the polymer resin is any value selected from a range of about 20 to about 30 weight percent of the coating composition.

6. The coating composition according to claim 1, wherein a weight loading of the polyamide resin is any value selected from a range of about 10 to about 20 weight percent of the coating composition.

7. The coating composition according to claim 1, further comprising:
fumed silica for increasing a viscosity of said coating composition.

8. The coating composition according to claim 1, wherein the suitable solvent comprises 1-methoxy-2-propanol.

9. The coating composition according to claim 1, wherein a weight loading of the solvent is any value selected from a range of about 40 to about 60 weight percent of the coating composition.

10. A method of forming a coating composition, the method comprising:
providing a polymer resin;
adding a polyamide resin to the polymer resin for curing the polymer resin;
adding a suitable solvent for dissolving the polymer resin and the polyamide resin;
adding a suitable pigment consisting of chromium oxide, iron oxide, aluminium oxide and titanium oxide in a weight ratio of chromium oxide: iron oxide: aluminium oxide: titanium oxide within a range of 5-5.1:5.3-5.4:0.3-0.4:0.2-0.3; and
adding a surfactant configured to lower interfacial tension between the solvent and the pigment consisting of chromium oxide, iron oxide, aluminium oxide and titanium oxide, the surfactant being a block copolymer with one or more pigment affinic groups;
wherein the coating composition is configured to form a coating having a near infrared light reflectance of above 0.25.

11. The method according to claim 10, wherein the suitable pigment is dispersed in the suitable solvent to form a dispersion before adding the polymer resin to form a mixture.

12. The method according to claim 11, further comprising:
dissolving the polyamide resin and a suitable hardener in a further suitable solvent to form a further mixture before mixing the mixture with the further mixture.

13. The method according to claim 11, further comprising:
mixing chromium oxide, iron oxide, aluminum oxide and titanium oxide; and
heating chromium oxide, iron oxide, aluminum oxide and titanium oxide to form the suitable pigment.

14. A method of forming a coating, the method comprising:
providing a substrate;
applying a coating composition onto the substrate; and
allowing the coating composition to cure to form the coating;
wherein the coating composition comprises:
a polymer resin;
a polyamide resin for curing the polymer resin;
a suitable pigment consisting of chromium oxide, iron oxide, aluminium oxide and titanium oxide in a weight ratio of chromium oxide: iron oxide: aluminium oxide: titanium oxide within a range of 5-5.1:5.3-5.4:0.3-0.4:0.2-0.3;
a suitable solvent for dissolving the polymer resin and the polyamide resin; and
a surfactant configured to lower interfacial tension between the solvent and the pigment consisting of chromium oxide, iron oxide, aluminium oxide and titanium oxide, the surfactant being a block copolymer with one or more pigment affinic groups;
wherein the coating composition is configured to form a coating having a near infrared light reflectance of above 0.25.

\* \* \* \* \*